UNITED STATES PATENT OFFICE.

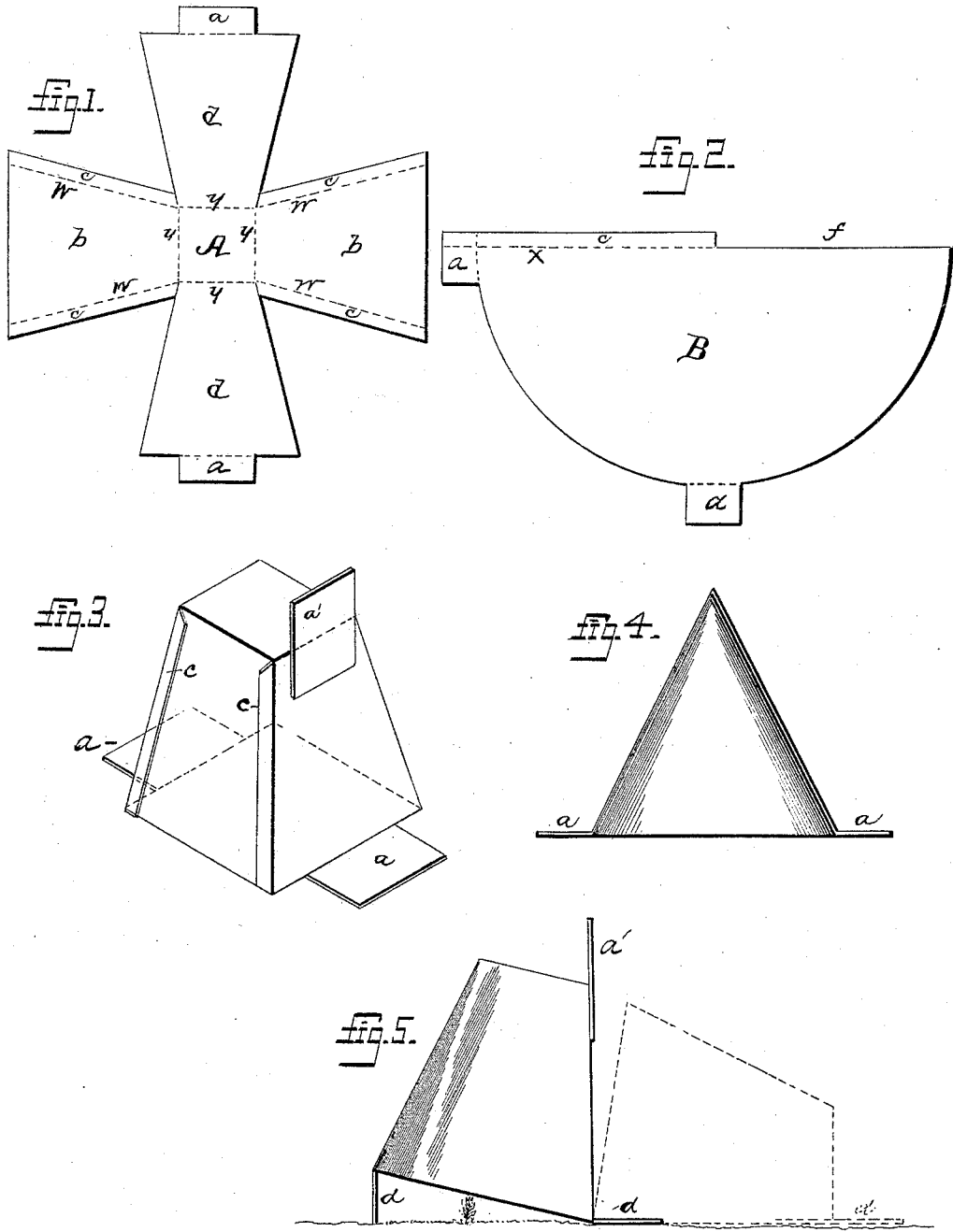

ROBERT GREEN BASS, OF EVINSTON, FLORIDA.

PLANT-PROTECTOR.

SPECIFICATION forming part of Letters Patent No. 436,329, dated September 16, 1890.

Application filed April 9, 1890. Serial No. 347,201. (No model.)

*To all whom it may concern:*

Be it known that I, ROBERT GREEN BASS, a citizen of the United States, residing at Evinston, in the county of Alachua and State of Florida, have invented certain new and useful Improvements in Caps or Protectors for Vegetable Plants; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a new and improved cap or protector for vegetable plants and the like, being specially designed for early vegetables in the field; and it consists in constructing said cap or protector out of paper, wood veneer, or other suitable material capable of being rendered water-proof and impregnated with an insecticide; and it further consists in forming said cap or protector of such shape that it may be readily and quickly adapted to either entirely cover the plant to protect it from frost and insects or raised to admit air to the plant, as may be desired.

The object of the invention is to produce a cap or protector constructed of some inexpensive material that can be easily rendered water-proof and insect-proof, and when thus constructed will prove a perfect protection to all kinds of vegetable plants against injury by frost and insects. This object is attained by the device hereinafter described, and illustrated in the accompanying drawings, in which—

Figure 1 represents one form of blank from which the cap or protector is formed; Fig. 2, another form; Fig. 3, the completed cap formed from the blank shown in Fig. 1; Fig. 4, the completed cap formed from the blank shown in Fig. 2; and Fig. 5, a cap in position to ventilate plants, showing in dotted lines the full exposure of the plant.

Similar letters refer to similar parts throughout the several views, in which—

A indicates a blank cut in the form of a Maltese cross, as shown in Fig. 1, and B another form of blank cut in the shape of a half-circle, as shown in Fig. 2. These blanks are preferably cut out of water-proof paper, thoroughly impregnated with an insecticide, and may be of any suitable size and shape.

The blank A, when properly shaped and its side edges secured together, forms a frustum-shaped cap, and the blank B, when its side edges are secured together, forms a cone-shaped cap. Each blank is formed with aprons $a\ a$, by means of which the cap may be secured upon the ground, as hereinafter specified. The arms $b\ b$ of the blank A are formed with flaps $c\ c$, adapted to lap over upon the side edges of the arms $d\ d$ and be secured thereupon.

To form the blank into proper shape the arms $b\ b$ and $d\ d$ are first creased at the dotted lines $y\ y$. The respective side edges are then brought together with the side edges of the arms $d\ d$ at the lines $w\ w$, and the flaps $c\ c$ secured upon said edges $d$ by means of cement or otherwise.

The blank B is formed with but one flap $c$, and is properly shaped into a cap by bringing the edges $f$ to the line $x$ and securing the flap down upon the said edge $f$.

The cap formed from blank A is provided at one side of the top with an apron $a'$, the purpose of which will presently appear.

To protect a plant from frost or insects the cap is placed over the plant with the bottom edge resting upon the ground and the aprons $a\ a$ in extended position, a small deposit of earth placed upon said aprons being sufficient to hold the cap against any ordinary means of displacement. When it is desired to air the plant, the cap is tilted to one side and one of the aprons $a$ used as a prop to hold it in position, as shown in Fig. 5. When the weather is mild and it is desired to give the plant the full benefit of air and sunshine, the cap is thrown back in the position shown by the dotted lines in Fig. 5 and there held by a small quantity of earth placed upon the apron $a'$. If a cold snap should come on, the plants may be again completely protected by removing the earth from the apron $a'$ and allowing the cap to assume its original position upon the ground.

It is preferred to manufacture the caps from paper, as such material can be more readily made absolutely water-proof and more thoroughly and completely impregnated with an insecticide than any other material. The insecticide that I prefer to employ is composed of coal-tar and tobacco or crude petroleum and tobacco, either of which will insure the perfect freedom of the plants from the fly that lays the egg. If wood veneer is used to construct the cap, the inside and outside thereof are thoroughly coated with a solution of either compound.

A cap thus constructed will cost but a trifle, so that it will be within the reach of every farmer. Its water-proof quality makes it durable, and its insect quality renders it valuable, especially to early-truck farmers, who are constantly annoyed and troubled by both frost and insects, and who frequently sustain heavy losses by having their crops damaged from the ravishes of these pests.

I am aware that a plant-protector comprising a cylindrical vessel and a conical cap made of paper, the cap being formed from a circular piece having a slit and a series of apertures and provided with lugs extending down from the edge of the cap-piece, has already been constructed; also, that certain other plant-protectors saturated with a suitable composition to make them offensive to worms, bugs, and other insects have been used prior to my invention, and these I do not claim.

Having thus fully described my invention, what I claim as new, and desire to secure by Letters Patent, is—

1. A cap for protecting plants, composed of suitable material rendered water and insect proof, formed with one or more aprons for securing it to the ground, a prop-piece for holding said cap in a tilted position, and an apron secured to the top of the cap for holding it in a position whereby the plant may be fully exposed to the air and light and there held until it is desired to re-cover the plant, substantially as specified.

2. A plant-protector made of suitable material rendered water and insect-proof by a coating of coal-tar or petroleum and tobacco and formed with securing-edges, aprons or flaps for securing it to the ground, and with a prop-piece whereby said protector may be held in a tilted position to admit air and light to the plant, substantially as specified.

3. The herein-described blank cut in the shape of a Maltese cross and formed with securing-edges, fastening-aprons or flaps, and a prop or tilting piece, said blank impregnated with coal-tar or petroleum and tobacco, as and for the purpose set forth.

In testimony whereof I affix my signature in presence of two witnesses.

ROBERT GREEN BASS.

Witnesses:
J. R. NOTTINGHAM,
JAMES G. JESTER.